United States Patent
Fernando (10) Patent No.: US 10,145,665 B2
(45) Date of Patent: Dec. 4, 2018

(54) POSITION MEASURING METHOD FOR REFERENCE SURFACE

(71) Applicant: TOYOTA JIDOSHA KABUSHIKI KAISHA, Toyota-shi, Aichi-ken (JP)

(72) Inventor: Dilshan Fernando, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 15/422,006

(22) Filed: Feb. 1, 2017

(65) Prior Publication Data

US 2017/0234670 A1   Aug. 17, 2017

(30) Foreign Application Priority Data

Feb. 12, 2016   (JP) .................................. 2016-024770

(51) Int. Cl.
| | |
|---|---|
| *G01B 5/012* | (2006.01) |
| *G01B 5/008* | (2006.01) |
| *G01B 5/28* | (2006.01) |
| *B23Q 17/22* | (2006.01) |
| *G01B 21/04* | (2006.01) |

(52) U.S. Cl.
CPC ............. *G01B 5/012* (2013.01); *B23Q 17/22* (2013.01); *G01B 5/008* (2013.01); *G01B 5/28* (2013.01); *G01B 21/04* (2013.01)

(58) Field of Classification Search
CPC ........... G01B 5/012; G01B 5/008; G01B 5/28
USPC ....... 33/503, 1 BB, 502, 549, 551, 552, 553, 33/554, 555, 501.02, 501.03; 73/1.79
See application file for complete search history.

(56) References Cited

U.S. PATENT DOCUMENTS

| | | | | |
|---|---|---|---|---|
| 6,457,366 B1* | 10/2002 | Hidaka | ................... | G01B 5/012 73/634 |
| 6,460,261 B1* | 10/2002 | Noda | ..................... | G01B 5/241 33/199 R |
| 7,041,963 B2* | 5/2006 | El Rifai | ................. | G01Q 40/00 250/234 |
| 2004/0221465 A1* | 11/2004 | Smith | ................... | G01B 5/0002 33/551 |
| 2007/0214864 A1* | 9/2007 | Proksch | ................. | F16F 7/1011 73/1.79 |
| 2007/0266582 A1* | 11/2007 | Nemoto | ................. | G01B 7/012 33/561 |
| 2008/0154527 A1* | 6/2008 | Staaden | ............. | G01D 5/24452 702/95 |
| 2009/0135433 A1* | 5/2009 | Iizuka | ..................... | G01B 5/28 356/601 |

(Continued)

FOREIGN PATENT DOCUMENTS

| | | |
|---|---|---|
| JP | 2007-024571 A | 2/2007 |
| JP | 2010-089182 A | 4/2010 |
| JP | 2013-238509 A | 11/2013 |

*Primary Examiner* — Christopher W Fulton
(74) *Attorney, Agent, or Firm* — Oliff PLC (57) ABSTRACT

A position measuring method is a method of measuring, by a probe, a position of a reference surface of a workpiece that is supported by a fixing tool when the workpiece is machined. According to the position measuring method, the probe is brought into contact with the reference surface at a plurality of different positions, and a height of the reference surface is measured. Then, a position at which the height of the reference surface is largest is set as the position of the reference surface.

6 Claims, 7 Drawing Sheets

(56) References Cited

U.S. PATENT DOCUMENTS

| | | | | |
|---|---|---|---|---|
| 2009/0207403 A1* | 8/2009 | Nemoto | ................. | G01B 5/008 356/124 |
| 2011/0246115 A1* | 10/2011 | Hon | ...................... | G01B 5/008 702/95 |
| 2015/0204653 A1* | 7/2015 | Przygodda | ........... | G01B 21/045 33/503 |
| 2015/0377617 A1* | 12/2015 | Ould | ...................... | G01B 21/04 702/168 |
| 2016/0131476 A1* | 5/2016 | Haverkamp | ............ | G01B 1/00 73/1.79 |

* cited by examiner

POSITION MEASURING METHOD FOR REFERENCE SURFACE

INCORPORATION BY REFERENCE

The disclosure of Japanese Patent Application No. 2016-024770 filed on Feb. 12, 2016 including the specification, drawings and abstract is incorporated herein by reference in its entirety.

BACKGROUND

1. Technical Field

The disclosure relates to a position measuring method for a reference surface at the time when a workpiece is machined.

2. Description of Related Art

A machine tool having a function of setting a measurement reference point of a workpiece is known. The machine tool is configured to obtain center coordinates of the workpiece and set the center coordinates as a measurement reference point for measuring, for example, a shape of the workpiece (see Japanese Patent Application Publication No. 2010-89182 (JP 2010-89182 A)). The machine tool sets a measurement reference position of the workpiece according to the following procedure.

First, a workpiece having a machining surface that is symmetric with respect to each of two lines perpendicular to each other is disposed such that the axes of a machine coordinate system are parallel to the two lines. Next, a spherical measuring portion of a probe of an on-machine measurement apparatus is moved relative to the workpiece toward an end surface of the workpiece from a position on the machining surface of the workpiece along a first line that is parallel to one of the two lines.

After the spherical measuring portion moves away from the end surface of the workpiece, coordinates at the time when a moving speed of the probe in its axial direction reaches a predetermined speed are stored. Then, the same procedure is performed with regard to a second line, which is parallel to the other one of the two lines, and coordinates are stored. Then, midpoints are obtained from the stored coordinates. The obtained midpoints are the center coordinates of the workpiece, and may be set as a measurement reference position of the workpiece.

SUMMARY

In some cases, a position of a reference surface of a workpiece and a machining position of the workpiece with respect to the reference surface are measured by a probe having a spherical measuring portion at its distal end as described in JP 2010-89182 A, and the workpiece is machined based on the measurement results. In this case, a machining apparatus configured to machine the workpiece pushes a spherical portion at a distal end of a fixing tool, which is configured to fix the workpiece, against the reference surface of the workpiece, then fixes the workpiece with respect to the reference surface, and then machines the workpiece at the machining position with respect to the reference surface based on the measurement results obtained by the probe.

However, the diameter of the spherical measuring portion at the distal end of the probe is a small diameter of, for example, several mm or less. Therefore, when a position of a reference surface of a workpiece having relatively rough asperities on its surface, such as a cast product, is measured, the spherical measuring portion may enter a depression of the surface of the workpiece. On the other hand, the diameter of a spherical portion at the distal end of a fixing tool for fixing a workpiece is usually a sufficiently large diameter in comparison with asperities of the surface of the workpiece. Therefore, the spherical portion of the fixing tool does not enter a depression of the surface of the workpiece, unlike the spherical measuring portion at the distal end of the probe.

For this reason, a deviation may be caused between the position of the reference surface of the workpiece measured by the probe and the position of the reference surface of the workpiece supported by the fixing tool. In this case, an error may be caused between a machining position of the workpiece with respect to the reference surface measured by the probe and a machining position of the workpiece with respect to the reference surface supported by the fixing tool.

The disclosure provides a position measuring method for a reference surface, the position measuring method making it possible to accurately measure, by a probe, a position of a reference surface supported by a fixing tool.

An aspect of the disclosure relates to a position measuring method of measuring, by a probe, a position of a reference surface of a workpiece that is supported by a fixing tool when the workpiece is machined. The position measuring method includes: bringing the probe into contact with the reference surface at a plurality of different positions, and measuring a height of the reference surface; and setting a position at which the height of the reference surface is largest, as the position of the reference surface.

The position measuring method for a reference surface according to the above aspect is used to measure a position of a reference surface of a workpiece machined by, for example, a machining apparatus. The reference surface serves as a reference for a machining position of the workpiece. For example, a pin-shaped chuck having a spherical support portion at its distal end may be used as the fixing tool. For example, a pin-shaped probe having a spherical portion at its distal end and used in a three-dimensional measuring machine may be used as the probe. The diameter of the spherical portion of the probe that comes into contact with the reference surface is, for example, about several mm. The diameter of the spherical support portion at the distal end of the fixing tool is, for example, 10 mm or more.

The diameter of the probe that is brought into contact with the reference surface is a small diameter of, for example, several mm or less. Therefore, when a position of a reference surface of a workpiece having relatively rough asperities on its surface, such as a cast product, is measured, the probe may enter a depression of the surface. On the other hand, the diameter of the spherical support portion at the distal end of the fixing tool is larger than the diameter of the spherical portion at the distal end of the probe. The diameter of the spherical support portion at the distal end of the fixing tool is such a value that the spherical support portion of the fixing tool does not enter a depression of the asperities of the reference surface, unlike the probe, and the spherical support portion of the fixing tool comes into contact with the reference surface at a position close to an apex of a projection of the asperities of the reference surface.

For this reason, in some cases, the probe enters a depression of the reference surface when the probe comes into contact with the reference surface, and measures a position of the contact point as a position of the reference surface, whereas the fixing tool comes into contact with the reference surface at a position close to an apex of a projection of the reference surface, and supports the reference surface at the position of the contact point. In this case, in a direction perpendicular to the reference surface, an error is caused between the position of the reference surface measured by the probe and the position of the reference surface supported by the fixing tool.

In order to reduce such an error, according to the position measuring method for a reference surface in the above aspect, the probe is brought into contact with the reference surface at a plurality of different positions, and a height of the reference surface is measured, and then a position at which the height of the reference surface is largest is set as the position of the reference surface, as described above. Here, the height of the reference surface is a position of the reference surface in a direction perpendicular to the reference surface when the reference surface has no asperities.

The probe is brought into contact with the reference surface at a plurality of different positions. Thus, even when the probe enters a depression of the reference surface at a certain position, the probe can be brought into contact, at another position, with the reference surface at a position close to an apex of a projection of the reference surface. Further, the position at which the height of the reference surface is largest is set as the position of the reference surface. In this way, in a height direction perpendicular to the reference surface, the position of the contact point, at which the fixing tool comes into contact with the reference surface, and the position of the contact point, at which the probe comes into contact with the reference surface, are made closer to each other. As a result, a measurement error of the reference surface can be further reduced.

In the above aspect of the disclosure, the different positions at which the probe is brought into contact with the reference surface may be set based on a distance from a support center position at the reference surface supported by the fixing tool. Thus, the height of the reference surface can be measured at a plurality of positions at which the fixing tool is highly likely to come into contact with the reference surface, and an error between the position of the reference surface supported by the fixing tool and the position of the reference surface measured by the probe can be further reduced. In addition, in the above aspect, the different positions may be set to positions symmetrical with respect to the support center position.

In the above aspect, the set position of the reference surface may be used to measure a machining position that is apart from the reference surface. Further, a hole having an axis substantially parallel to the reference surface may be formed at the machining position.

As can be understood from the above description, the position measuring method for a reference surface according to the above aspect makes it possible to more accurately measure, by the probe, a position of a reference surface supported by the fixing tool.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a position measuring method for a reference surface according to an embodiment of the disclosure will be described with reference to the accompanying drawings.

Figure 1A:
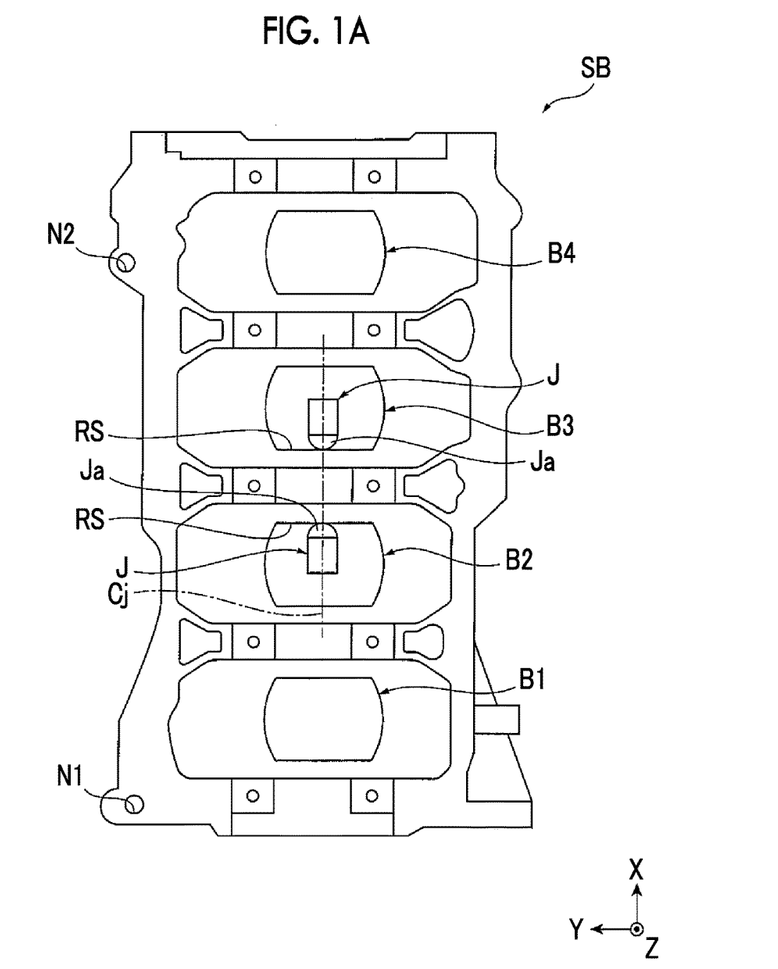
FIG. 1A is a plan view of a cylinder block to which a position measuring method according to an embodiment is applied.
Figure 1B:
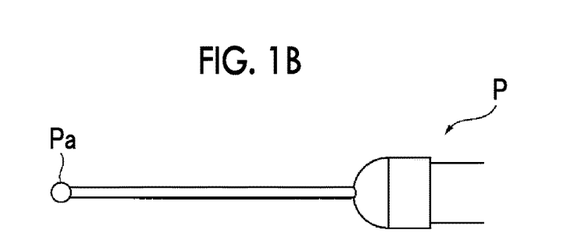
FIG. 1B is a plan view of a probe used in the position measuring method according to the embodiment.

FIG. 1A is a plan view of a cylinder block SB to which the position measuring method for a reference surface according to the present embodiment is applied. FIG. 1B is a plan view illustrating an example of a probe.

The cylinder block SB is a cast product made of metal and including a plurality of bores B1, B2, B3, B4. The cylinder block SB has relatively rough asperities on its surfaces. The cylinder block SB includes the four bores B1, B2, B3, B4. A flat inner side surface of the second bore B2 and a flat inner side surface of the third bore B3, the flat inner side surfaces being adjacent to each other, are used as reference surfaces RS. In the plan view illustrated in FIG. 1A, a direction perpendicular to the reference surfaces RS is an X-axis direction, a direction perpendicular to the X-axis and parallel to the reference surfaces RS is a Y-axis direction, and a direction perpendicular to the X-axis and the Y-axis and parallel to the reference surfaces RS is a Z-axis direction. For example, knock holes N1, N2 are to be formed in the cylinder block SB at predetermined machining positions by a machining apparatus (not illustrated).

A pair of fixing tools J are provided. The fixing tools J hold a portion of the cylinder block SB between the second bore B2 and the third bore B3, and fix the cylinder block SB to the machining apparatus (not illustrated). Each of the fixing tools J is a pin-shaped or columnar chuck having a central axis Cj that is substantially parallel to the X-axis direction perpendicular and to the reference surface RS. Each of the fixing tools J has a spherical support portion Ja at its distal end that is brought into contact with the reference surface RS. The diameter of a spherical surface of the support portion Ja at the distal end of each fixing tool J is, for example, equal to or larger than 10 mm, and is, more specifically, for example, about 16 mm.

When the support portions Ja of the fixing tools J are brought into contact with the reference surfaces RS in the X-axis direction, the fixing tools J position and fix the cylinder block SB in the X-axis direction with respect to the reference surfaces RS. Note that, the cylinder block SB further has reference surfaces RS (not illustrated) in the Y-axis direction. When other fixing tools J (not illustrated) are brought into contact with the reference surfaces RS in the Y-axis direction, and the cylinder block SB is positioned and fixed in the Y-axis direction with respect to the reference surfaces RS.

The machining apparatus (not illustrated) is, for example, a machining center configured to machine the cylinder block SB. The machining apparatus (not illustrated) machines the cylinder block SB at predetermined machining positions with respect to the positions of the reference surfaces RS supported by the support portions Ja at the distal ends of the fixing tools J. The machining apparatus form, for example, the knock holes N1, N2 at the predetermined machining positions of the cylinder block SB, based on the results of measurements of the positions of the reference surfaces RS of the cylinder block SB and the machining positions of the cylinder block SB with respect to the reference surfaces RS. The positions of the reference surfaces RS and the machining positions of the cylinder block SB are measured in advance by the probe P.

The probe P is, for example, a pin-shaped probe of a three-dimensional measuring machine, and has a spherical portion Pa at its distal end. The diameter of the spherical portion Pa is, for example, about several mm, and is, more specifically, for example, about 2.5 mm. Before the cylinder block SB is machined by the machining apparatus, the probe P is brought into contact with each of the reference surfaces RS and the machining positions of the cylinder block SB, thereby measuring the positions of the reference surfaces RS and the machining positions. The results of measurements of the positions of the reference surfaces RS and the machining positions of the cylinder block SB, which are obtained by the probe P, are used for machining of the cylinder block SB performed by the machining apparatus.

Figure 2A:
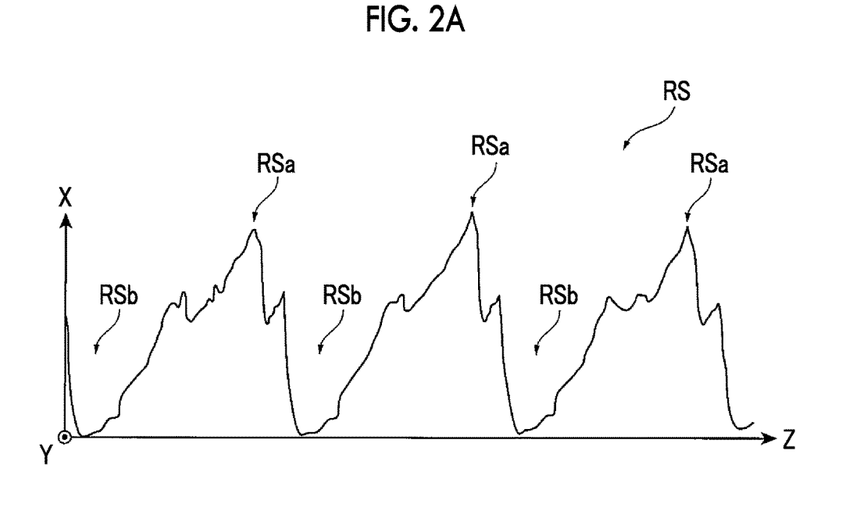
FIG. 2A is an enlarged sectional view of a reference surface illustrated in FIG. 1A.
Figures 2B, 2C:
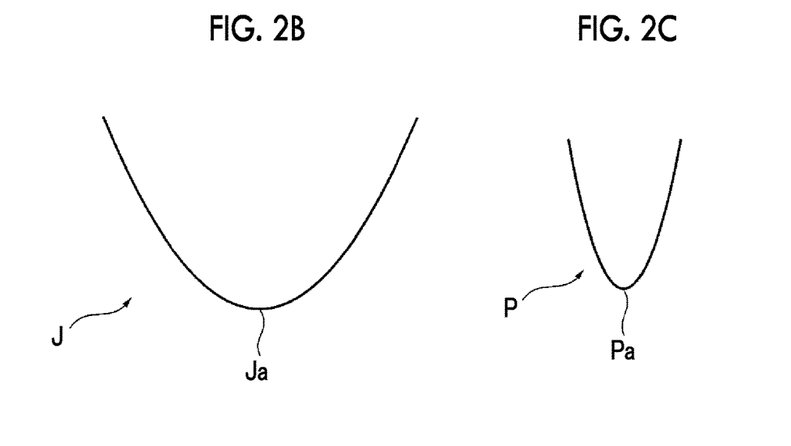
FIG. 2B is an enlarged sectional view of a fixing tool illustrated in FIG. 1A.
FIG. 2C is an enlarged sectional view of the probe illustrated in FIG. 1B.

FIG. 2A is an enlarged sectional view of the reference surface RS of the cylinder block SB. FIG. 2B is an enlarged sectional view of the support portion Ja at the distal end of the fixing tool J. FIG. 2C is an enlarged sectional view of the spherical portion Pa at the distal end of the probe P. Note that, in the drawings, the enlargement factor in the up-down direction is 20 times as high as the enlargement factor in the transverse direction.

Each reference surface RS of the cylinder block SB has relatively rough asperities. The asperities of each reference surface RS include a plurality of projections RSa and a plurality of depressions RSb formed between the projections RSa. The diameter of the spherical portion Pa at the distal end of the probe P is smaller than the diameter of the support portion Ja at the distal end of the fixing tool J. The diameter of the spherical portion Pa of the probe P is such a value that the spherical portion Pa can enter each of the depressions RSb constituting the asperities of the reference surface RS. On the other hand, the diameter of the support portion Ja at the distal end of the fixing tool J is larger than the diameter of the spherical portion Pa at the distal end of the probe P. The diameter of the support portion Ja of the fixing tool J is such a value that the support portion Ja cannot enter each of the depressions RSb constituting the asperities of the reference surface RS, unlike the probe P.

Figure 3:
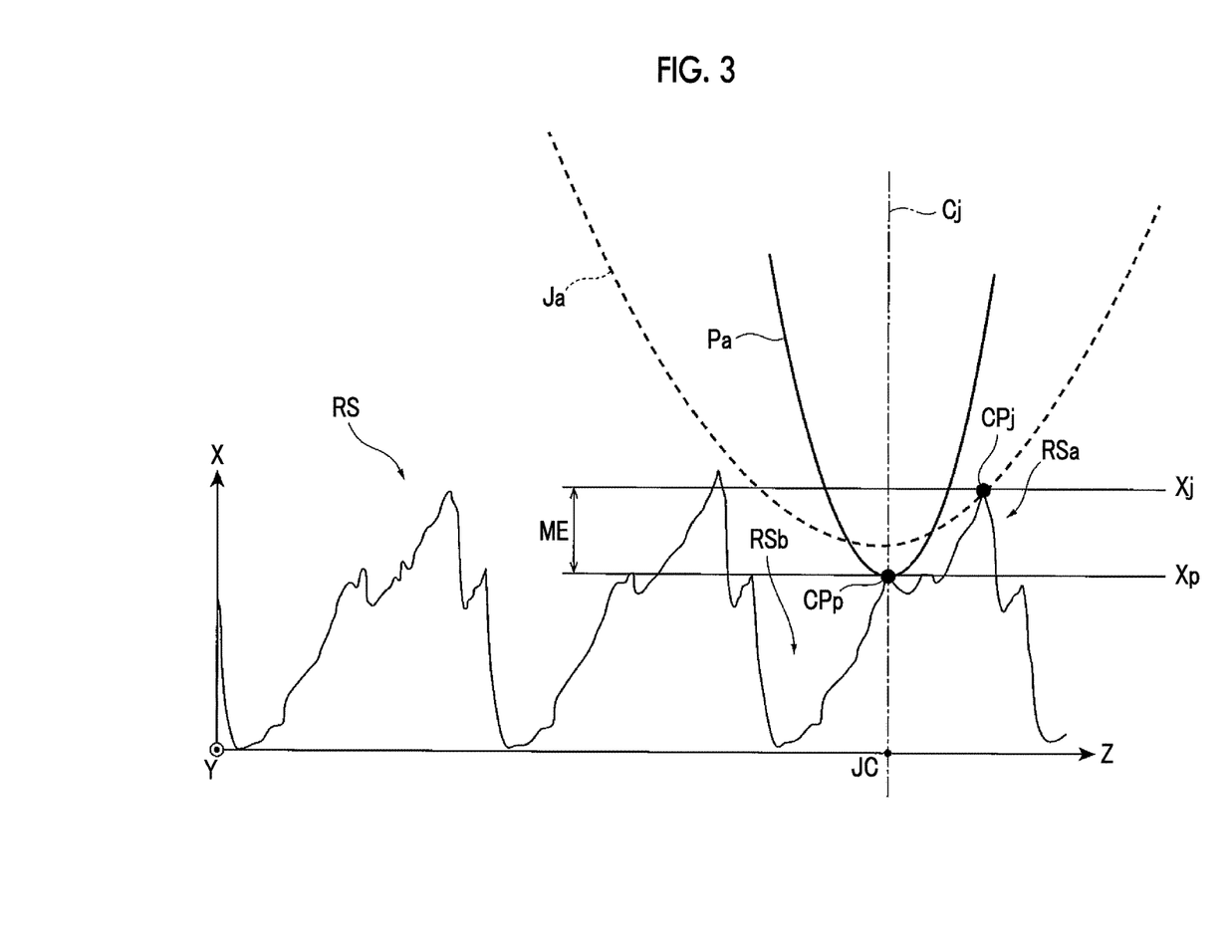
FIG. 3 is an enlarged sectional view illustrating a measurement error of the reference surface at a support center position of the fixing tool.

FIG. 3 is an enlarged sectional view illustrating a measurement error ME of the reference surface RS, at a support center position JC of the fixing tool J. In FIG. 3, the enlargement factor in the up-down direction is 20 times as high as the enlargement factor in the transverse direction, as in FIGS. 2A to 2C.

As described above, the diameter of the support portion Ja at the distal end of the fixing tool J is such a value that the support portion Ja cannot reach a deep position inside each of the depressions RSb constituting the asperities of the reference surface RS. Thus, a contact point CPj at which the support portion Ja comes into contact with the reference surface RS is a position close to the distal end of the projection RSa of the reference surface RS. The position of the central axis Cj of the fixing tool J on a Y-Z plane, which is parallel to the reference surface RS, when the support portion Ja comes into contact with the reference surface RS as described above is set as the support center position JC of the fixing tool J. In this case, when the probe P is brought into contact with the reference surface RS at the support center position JC of the fixing tool J, the probe P comes into contact with the reference surface RS at a contact point CPp in a state in which the probe P reaches a deeper position inside the depression RSb of the asperities of the reference surface RS than the position that the support portion Ja of the fixing tool J reaches.

In this case, the height of the contact point CPp at which the spherical portion Pa of the probe P comes into contact with the reference surface RS, that is, a position Xp of the contact point CPp in the X-axis direction, is a measured value of a position of the reference surface RS in the X-axis direction, which is obtained by the probe P, whereas the height of the contact point CPj at which the support portion Ja of the fixing tool J comes into contact with the reference surface RS, that is, a position Xj of the contact point CPj in the X-axis direction, is a position of the reference surface RS in the X-axis direction at the time when machining is performed by the machining apparatus. Therefore, the position Xp of the reference surface RS in the X-axis direction, which is measured by the probe P, has the error ME, which is a difference between the position Xp and the position Xj of the reference surface RS in the X-axis direction at the time when machining is performed by the machining apparatus.

Therefore, when the machining apparatus machines the cylinder block SB at the machining positions based on the position Xp measured by the probe P and having the error ME with respect to the position Xj of the reference surface RS, an error may be caused in, for example, each of the positions of the knock holes N1, N2 formed in the cylinder block SB. In order to reduce such an error, according to the position measuring method for a reference surface in the present embodiment, the position of the reference surface RS is measured according to the procedure described below.

Figure 4:
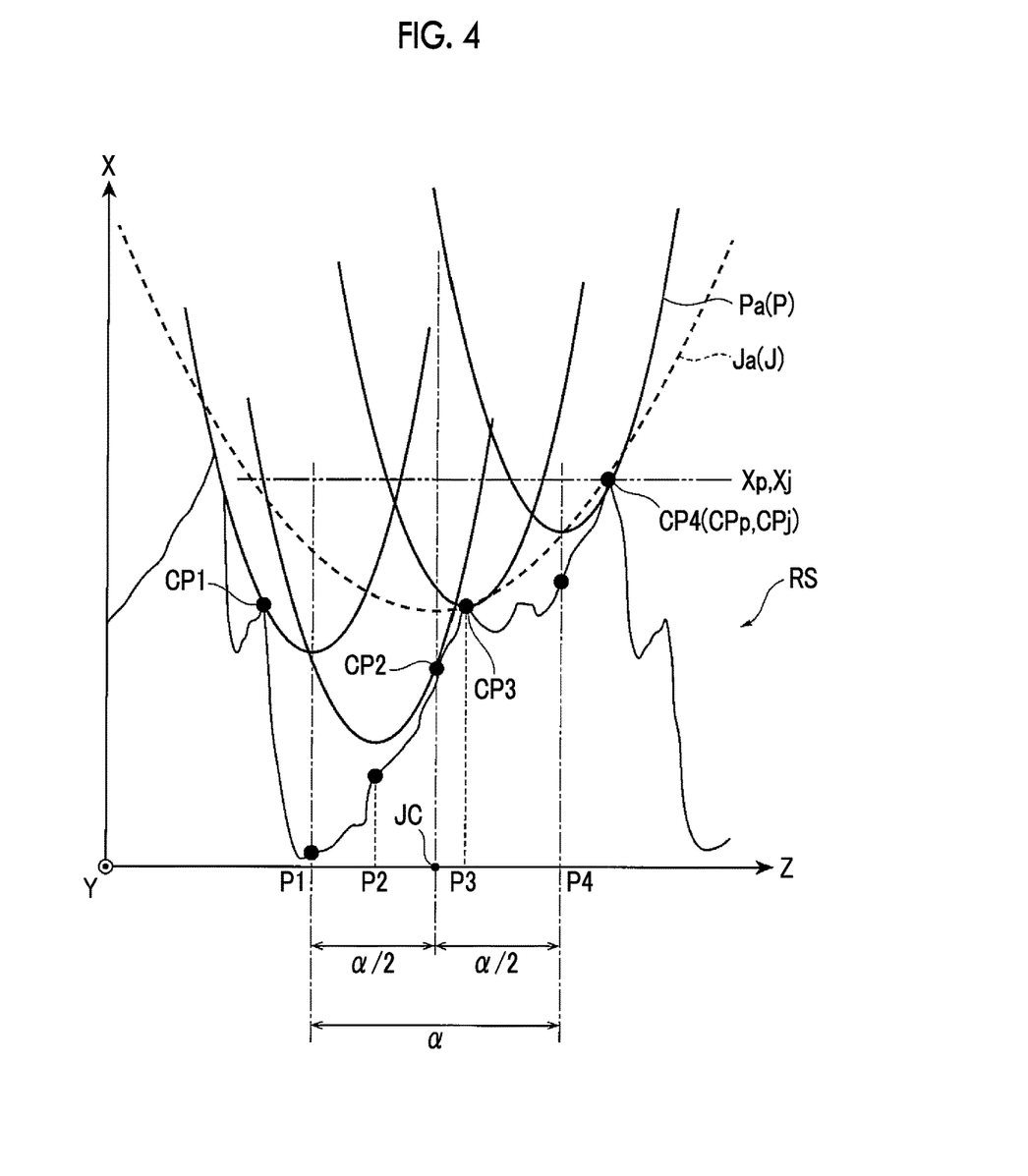
FIG. 4 is an enlarged sectional view illustrating an example of height measurement performed at a plurality of positions on the reference surface.

FIG. 4 is an enlarged sectional view illustrating the position measuring method for a reference surface according to the present embodiment. FIG. 4 is an enlarged sectional view illustrating an example of height measurement performed at a plurality of positions on the reference surface RS. In FIG. 4, the enlargement factor in the up-down direction is 20 times as high as the enlargement factor in the transverse direction, as in FIGS. 2A to 2C.

As described above, the position measuring method for a reference surface according to the present embodiment is a method in which the position Xj of the reference surface RS, at which the reference surface RS is supported by the support portion Ja of the fixing tool J is measured by the probe P. In the position measuring method for the reference surface RS according to the present embodiment, first, the probe P is brought into contact with the reference surface RS at a plurality of different positions P1, P2, P3, P4, thereby measuring a height of the reference surface RS. More specifically, the probe P is moved in the X-axis direction at each of the positions P1, P2, P3, P4 on the Y-Z plane that is parallel to the reference surface RS, the spherical portion Pa at the distal end of the probe P is brought into contact with the asperities of the reference surface RS, and positions of contact points CP1, CP2, CP3, CP4 in the X-axis direction are measured as heights of the reference surface RS.

Then, the position Xp at which the height of the reference surface RS is largest is set as the position of the reference surface RS. More specifically, among the positions of the contact points CP1, CP2, CP3, CP4 in the X-axis direction, which are measured at the positions P1, P2, P3, P4 on the Y-Z plane that is parallel to the reference surface RS, the position Xp at which the reference surface RS protrudes by a largest amount in the X-axis direction is set as the position of the reference surface RS. Such a measurement of a position of the reference surface RS can be performed by a three-dimensional measuring machine provided with the probe P.

In this way, in the X-axis direction perpendicular to the reference surface RS, the error ME between the position of the contact point CPj at which the fixing tool J comes into contact with the reference surface RS and the contact point CPp at which the probe P comes into contact with the reference surface RS is reduced, and thus the error ME between the position Xp of the reference surface RS measured by the probe P and the position Xj of the reference surface RS, at which the reference surface RS is supported by the fixing tool J is reduced. Therefore, according to the position measuring method for a reference surface in the present embodiment, the position of the reference surface RS supported by the fixing tool J can be accurately measured by the probe P.

A measurement range α in which the probe P is brought into contact with a plurality of different positions on the reference surface RS can be set, for example, based on a distance from the support center position JC at the reference surface RS supported by the fixing tool J. Hereinafter, a concrete example of a method of setting the measurement range α of the reference surface RS illustrated in FIG. 4 will be described in detail.

Figure 5:
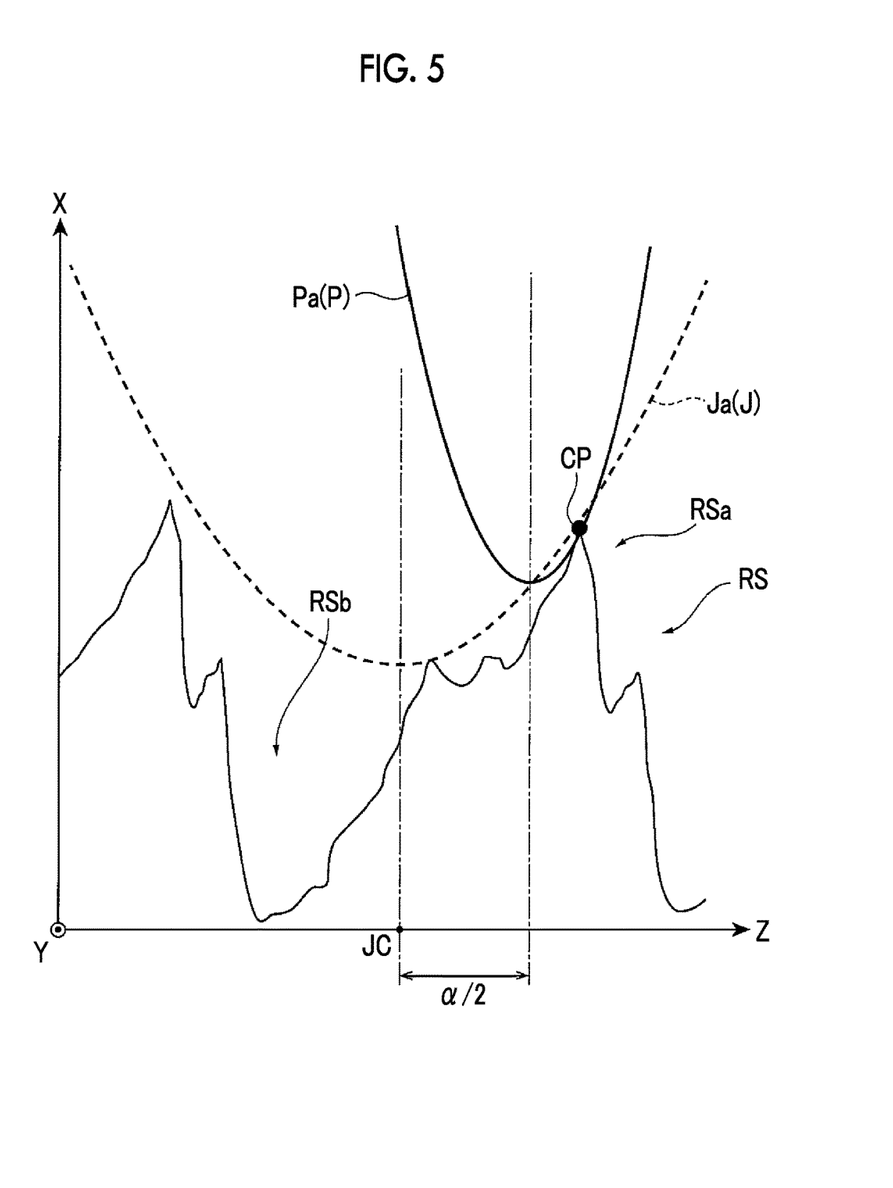
FIG. 5 is an enlarged sectional view illustrating an example of a method of setting a measurement range illustrated in FIG. 4.

FIG. 5 is an enlarged sectional view illustrating an example of the method of setting the measurement range α of the reference surface RS illustrated in FIG. 4. In FIG. 5, the enlargement factor in the up-down direction is 20 times as high as the enlargement factor in the transverse direction, as in FIGS. 2A to 2C.

First, the contour shape of a section of the support portion Ja at the distal end of the fixing tool J is disposed at a position at which the support portion Ja most deeply enters the depression RSb of the contour shape of a section of the asperities of the reference surface RS and the support portion Ja comes into contact with the projection RSa at the contact point CP. Next, the contour shape of a section of the spherical portion Pa of the probe P is disposed at a position at which the spherical portion Pa comes into contact with the contact point CP at which the contour shape of the section of the support portion Ja of the fixing tool J comes into contact with the projection RSa of the section of the asperities of the reference surface RS. Then, within a range in which the contour shape of the section of the spherical portion Pa of the probe P can be kept in contact with the contact point CP, the contour shape of the section of the spherical portion Pa of the probe P is disposed at a position at which the spherical portion Pa most deeply enters the depression RSb of the contour shape of the section of the asperities of the reference surface RS.

In this state, a center-to-center distance α/2, in a direction parallel to the reference surface RS or the Y-Z plane, between the center of the spherical portion Pa of the probe P and the center of the support portion Ja of the fixing tool J is measured. Then, as illustrated in FIG. 4, a range a is set as the measurement range α of the reference surface RS. In one or more directions parallel to the reference surface RS or the YZ plane, the range a has a length two times longer than the center-to-center distance α/2 and has a center that coincides with the central position of the support portion Ja of the fixing tool J, that is, the support center position JC.

Figure 6A:
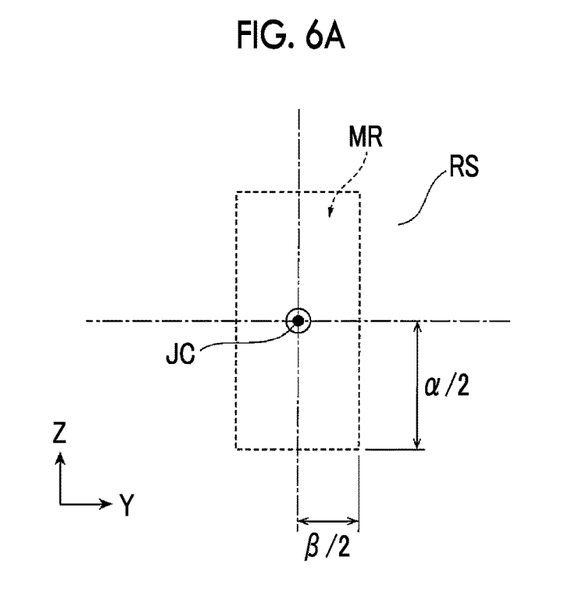
FIG. 6A is a side view illustrating an example of a method of setting a measurement range.

FIG. 6A is a side view illustrating another example of a method of setting a measurement range MR of the reference surface RS.

The measurement range MR of the reference surface RS may be set as described below. First, as illustrated in FIG. 6A, the support center position JC of the fixing tool J on the reference surface RS or the Y-Z plane is set according to the method described with reference to FIG. 5. Next, the center-to-center distance α/2 and the center-to-center distance β/2 between the center of the spherical portion Pa of the probe P and the center of the support portion Ja of the fixing tool J are measured respectively in two directions parallel to the reference surface RS or the Y-Z plane, for example, in the Z-axis direction and the Y-axis direction according to the method described with reference to FIG. 5.

Figure 6B:
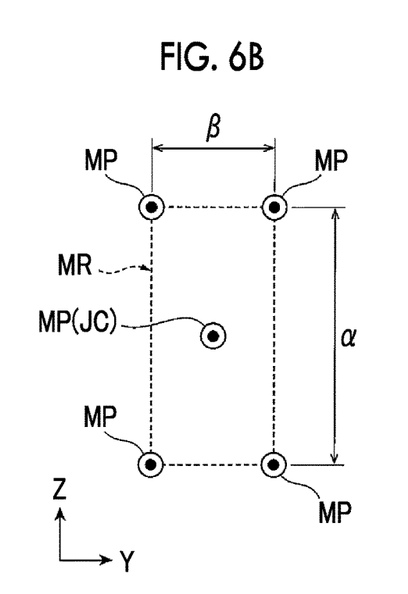
FIG. 6B is a side view illustrating an example of height measurement performed at a plurality of positions on the reference surface.

For example, when a length α that is two times longer than the center-to-center distance α/2 in the Z-axis direction is equal to or longer than 0.1 mm and a length β that is two times longer than the center-to-center distance β/2 in the Y-axis direction is equal to or longer than 0.1 mm, the measurement range MR can be set as illustrated in FIG. 6B. That is, a rectangular range having a length α in the Z-axis direction and a length β in the Y-axis direction and having a center that coincides with the support center position JC of the fixing tool J can be set as the measurement range MR. When the measurement range MR has such a rectangular shape, measurement positions MP at which the probe P is brought into contact with the reference surface RS can be disposed at four corners and the center of the rectangular measurement range MR.

Figure 6C:
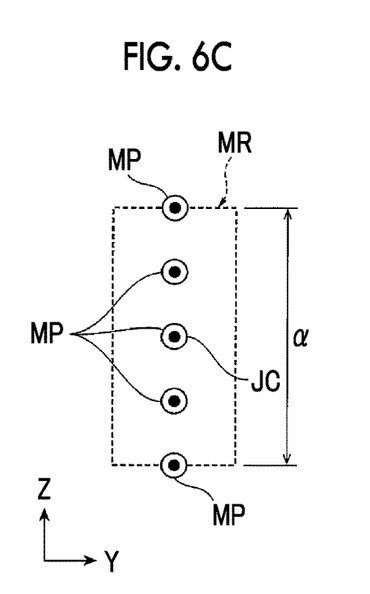
FIG. 6C is a side view illustrating an example of height measurement performed at a plurality of positions on the reference surface.

For example, when a length α that is two times longer than the center-to-center distance α/2 in the Z-axis direction is equal to or longer than 0.1 mm and a length β that is two times longer than the center-to-center distance β/2 in the Y-axis direction is shorter than 0.1 mm, the measurement range MR can be set as illustrated in FIG. 6C. That is, a linear range having a length α in the Z-axis direction and having a center that coincides with the support center position JC of the fixing tool J can be set as the measurement range MR. When the linear measurement range MR has such a linear shape, measurement positions MP at which which the probe P is brought into contact with the reference surface RS can be disposed at both ends of the measurement range MR and at positions located between the both ends at equal intervals.

As described above, according to the position measuring method for a reference surface in the present embodiment, the different positions MP at which the probe P is brought into contact with the reference surface RS can be set based on the distances α/2, β/2 from the support center position JC at the reference surface RS supported by the fixing tool J. Thus, a height of the reference surface RS can be measured at the positions MP at which the fixing tool J is highly likely to come into contact with the reference surface RS. Thus, the error ME between the position Xj of the reference surface RS, at which the reference surface RS is supported by the fixing tool J, and the position Xp of the reference surface RS measured by the probe P can be further reduced.

Figure 7:
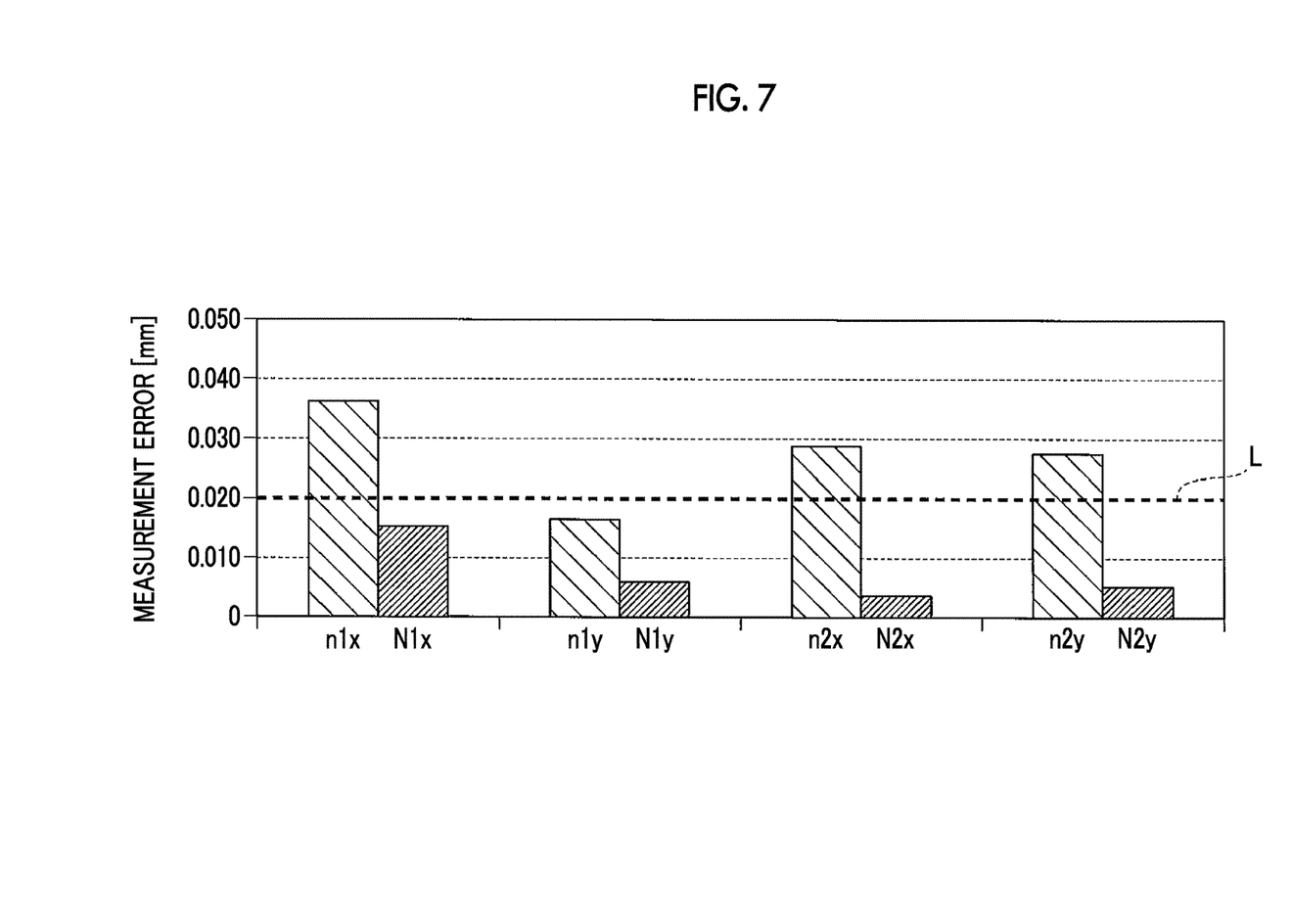
FIG. 7 is a graph illustrating reduction of an error achieved by the position measuring method for a reference surface according to the embodiment.

FIG. 7 is a graph illustrating reduction of an error at each machining position of the cylinder block SB, which is achieved by the position measuring method for a reference surface according to the present embodiment of the disclosure.

FIG. 7 illustrates measurement errors of a main knock hole N1 and a sub-knock hole N2 of the cylinder block SB, which are formed through machining performed by the machining apparatus based on the positions Xp of the reference surfaces RS measured by the position measuring method for a reference surface according to the present embodiment and by a position measuring method according to related art. In FIG. 7, N1$x$ denotes a measurement error of the main knock hole N1 in the X-axis direction, N1$y$ denotes a measurement error of the main knock hole N1 in the Y-axis direction, N2$x$ denotes a measurement error of the sub-knock hole N2 in the X-axis direction, and N2$y$ denotes a measurement error of the sub-knock hole N2 in the Y-axis direction.

In addition, in FIG. 7, n1$x$ denotes a measurement error of a main knock hole in the X-axis direction, n1$y$ denotes a measurement error of the main knock hole in the Y-axis direction, n2$x$ denotes a measurement error of a sub-knock hole in the X-axis direction, and n2$y$ is a measurement error of the sub-knock hole in the Y-axis direction.

The measurement error n1$x$ of the main knock hole in the X-axis direction based on the position measuring method for a reference surface according to the related art is about 0.035 mm that exceeds 0.020 mm, which is a reference tolerance width indicated by a dashed line L. On the other hand, the measurement error N1$x$ of the main knock hole N1 in the X-axis direction based on the position measuring method for a reference surface according to the present embodiment is reduced to about 0.015 mm. According to the present embodiment, the measurement error is reduced to half or less of the measurement error in the related art.

In addition, the measurement error n1$y$ of the main knock hole in the Y-axis direction based on the position measuring method for a reference surface according to the related art is about 0.016 mm, whereas the measurement error N1$y$ of the main knock hole N1 in the Y-axis direction based on the position measuring method for a reference surface according to the present embodiment is reduced to about 0.006 mm. According to the present embodiment, the measurement error is reduced to half or less of the measurement error in the related art.

In addition, the measurement error n2$x$ of the sub-knock hole in the X-axis direction based on the position measuring method for a reference surface according to the related art is about 0.028 mm that exceeds 0.020 mm, which is a reference tolerance width indicated by the dashed line L. On the other hand, the measurement error N2$x$ of the sub-knock hole N2 in the X-axis direction based on the position measuring method for a reference surface according to the present embodiment is reduced to about 0.003 mm. According to the present embodiment, the measurement error is reduced to 1/9 or less of the measurement error in the related art.

In addition, the measurement error n2$y$ of the sub-knock hole in the Y-axis direction based on the position measuring method for a reference surface according to the related art is about 0.027 mm that exceeds 0.020 mm, which is a reference tolerance width indicated by the dashed line L. On the other hand, the measurement error N2$y$ in the Y-axis direction of the sub-knock hole N2 based on the position measuring method for a reference surface according to the present embodiment is reduced to about 0.004 mm. According to the present embodiment, the measurement error is reduced to 1/6 or less of the measurement error in the related art.

The above-described results indicate that, according to the position measuring method for a reference surface in the present embodiment, the position Xj of the reference surface RS, at which the reference surface RS is supported by the fixing tool J, is more accurately measured by the probe P, and thus a workpiece, such as the cylinder block SB having the reference surface RS, can be machined more accurately than in the related art.

While the example embodiment of the disclosure has been described in detail with reference to the accompanying drawings, the concrete configurations are not limited to those in the foregoing embodiment and design changes or the like within the scope of the disclosure may be included in the disclosure.

For example, in the foregoing embodiment, a cylinder block is described as an example of a workpiece having a reference surface. However, a workpiece having a reference surface is not limited to a cylinder block. The embodiment may be applied any workpiece as long as the workpiece has asperities on its surface and a reference surface and a machining position are measured by a probe before machining.

What is claimed is:

1. A position measuring method of measuring, by a probe, a position of a reference surface of a workpiece that is supported by a fixing tool when the workpiece is machined, the position measuring method comprising:
   bringing the probe into contact with the reference surface at a plurality of different positions, and measuring a height of the reference surface; and
   setting a position at which the height of the reference surface is largest, as the position of the reference surface.

2. The position measuring method according to claim 1, wherein the different positions at which the probe is brought into contact with the reference surface are set based on a distance from a support center position at the reference surface supported by the fixing tool.

3. The position measuring method according to claim 2, wherein the different positions are set to positions symmetrical with respect to the support center position.

4. The position measuring method according to claim 1, wherein the set position of the reference surface is used to measure a machining position that is apart from the reference surface.

5. The position measuring method according to claim 4, wherein a hole having an axis substantially parallel to the reference surface is formed at the machining position.

6. The position measuring method according to claim 1, wherein the height of the reference surface is a position of the reference surface in a direction perpendicular to the reference surface when the reference surface has no asperities.

* * * * *